Feb. 18, 1969   W. O. KORF ET AL   3,428,230
SPARE WHEEL HOLDER
Filed Nov. 16, 1967

INVENTORS
WALTER O. KORF
KENNETH A. ROTH
BY Robert C. Baker
ATTORNEY

United States Patent Office 3,428,230
Patented Feb. 18, 1969

3,428,230
SPARE WHEEL HOLDER
Walter O. Korf, 1074 Euclid Ave., and Kenneth A. Roth, 1201 E. Ross Ave., both of St. Paul, Minn. 55106
Filed Nov. 16, 1967, Ser. No. 683,726
U.S. Cl. 224—42.06        9 Claims
Int. Cl. B62d 43/02, 43/08

ABSTRACT OF THE DISCLOSURE

The spare wheel holder consists essentially of simplified attachment means plus a single metal bar held by the attachment means in an upwardly projecting direction when the spare wheel holder is operably affixed to a vehicle. The holder is preferably attached at the rear of a vehicle to a trailer hitch of the ball-type, but can be attached to a bumper or other bar-like part anywhere on the vehicle. The single metal bar is characterized by having an essentially flat vertically-oriented rim mounting plate section as its uppermost part, a sloping shift section connected to that rim mounting plate section through a bend of the metal bar, a tire recess plate section, and preferably a horizontally-projecting tire rest plate. The rim mounting plate section has a fixed bolt position at one end thereof and at least two alternative bolt positions at measured predetermined increments from the other end thereof. These bolt positions are used in mounting the rim of the spare wheel to the spare wheel holder.

---

This invention relates to a new spare wheel holder for vehicles such as automobiles and trucks or tractors and the like. It is especially useful when additional space in the trunk or internal tire storage area of an automobile is needed.

Frequently, while on a trip, one is bothered by the excessive trunk space occupied by a spare tire-rim combination and the loss of that space for storage of luggage or sports equipment. On the other hand, that spare wheel cannot be left behind; and the usual solution to the problem has been either to leave some luggage or sports equipment behind, or else to clutter up the passenger space with the desired items.

Of course, many prior art patents are extant dealing with spare wheel holders. All, however, direct those skilled in the art to complex or cumbersome or bulky arrangements of elements, or to relatively permanent fixtures on the exterior of the automobile, or both.

This invention provides a novel solution to the problem of gaining extra storage space by the simple expedient of removing the spare wheel from the trunk compartment while at the same time keeping the spare wheel with the automobile and ready for emergency use. Instead of solving this problem in such a cumbersome way that extra equipment for mounting the spare wheel must be attached permanently on the exterior of the automobile regardless of whether or not the spare wheel is carried exteriorly of the automobile, the invention provides an attractive solution requiring only the minimum of apparatus elements arranged in an extremely compact and easily removable form so that the spare wheel holder need be on the exterior of the automobile only when the spare wheel is also carried exteriorly. A very important advantage of the invention is that, after stopping for the night and removing luggage from the trunk of the automobile, the spare wheel and spare wheel holder can conveniently be removed as a unit from the exterior of the automobile and stored in the trunk in locked up condition.

An additional important characteristic of the spare wheel holder is that, when it is properly attached to the rear of the automobile, it does not interfere with tail lights, nor most centrally located rear gas tank openings, centrally located license plates and the like. Also, the lowest part of a tire on a rim mounted on the spare wheel holder is about as low as the lowest level of the rear bumper. Thus, the spare tire wheel mounted on the holder is sufficiently low to not interfere with rear-view vision through the rear window of the automobile.

Further advantages and benefits of the invention will be evident from the continued disclosure to follow, taken with the accompanying drawing, wherein.

Figure 1:
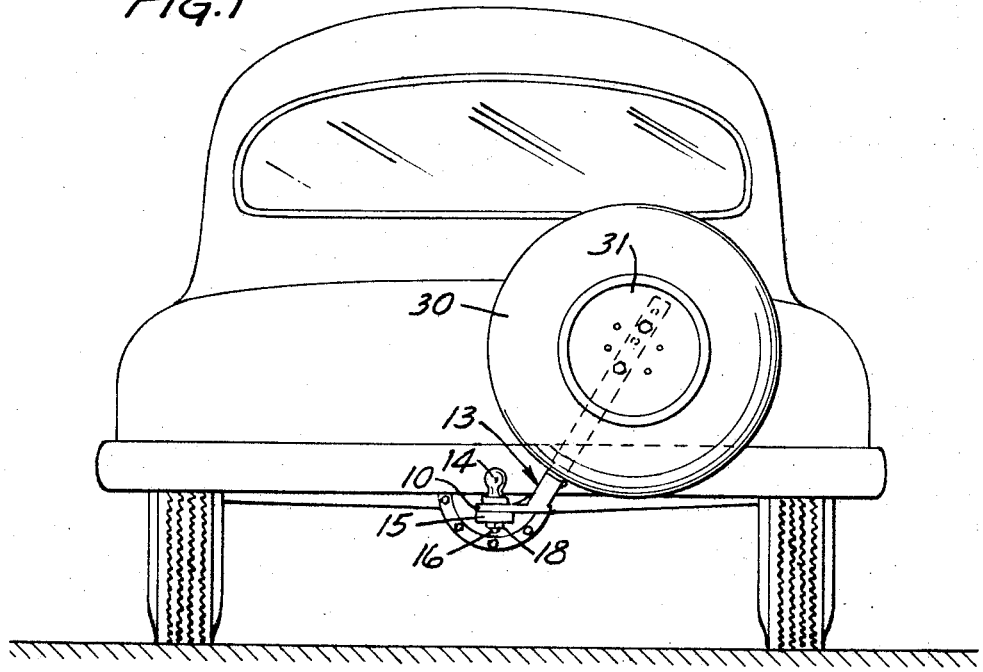
FIGURE 1 is a plan view of the rear of an automobile showing a spare tire and rim mounted on the spare wheel holder of the invention, with the latter affixed to the rear of the automobile solely at the bolt of the trailer hitch ball (and with the clamps for affixing the holder to a bumper omitted)
Figure 2:
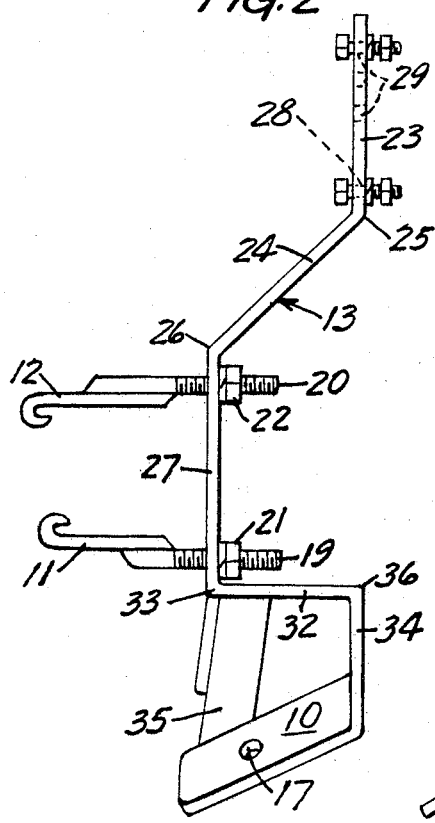
FIGURE 2 is a plan side view of the spare wheel holder, including the clamps for affixing the holder to a bumper.

Referring to the drawing, the spare wheel holder of the invention consists essentially of attachment means, such as either a flange 10 or claws 11 and 12, adapted for removably and operably affixing the holder to the rear part of an automobile, plus a single metal bar 13 held by the attachment means in an upwardly projecting direction from the attachment means when the holder is operably affixed to the rear of an automobile. It should be recognized that, while FIGURE 2 illustrates two different forms of attachment means, only one is critically necessary in any one spare wheel holder according to the invention. However, it is much preferred to supply spare wheel holders of the invention in the form precisely as illustrated in FIGURE 2. This permits the user to have available alternate means for attaching it to an automobile and does not make the use of the spare wheel holder dependent upon prior mounting of a trailer hitch ball 14 and its bearing plate 15 to the automobile. Of course, the preferred form of attachment means is as illustrated in FIGURE 1 of the drawing, where the spare wheel holder is attached to the rear of the automobile by inserting the bolt 16 of ball 14 through the mounting hole 17 of flange 10 and tightening flange 10 against bearing plate or two bar 15 by means of the nut 18.

The clamping attachment means for the holders may readily be appreciated from the drawing to comprise two claws 11 and 12 mounted in holes in the single metal bar (at spaced locations other than in the rim mounting plate section 23 and other than in the upper third of the sloping shift section 24). These clamps are equipped with tensioning means such as the combination of threaded rod members 19 and 20 plus nuts 21 and 22. It will readily be apparent that the claw 11 is adapted to grip the bottom of the bumper (suitably at the rear of the automobile) and the claw 12 is adapted to grip the top of the bumper so as to orient the single metal bar 13 in an upwardly projecting direction approximately perpendicular to the bumper of the automobile. This form of attachment makes for an extraordinarily simple spare wheel holder, since the alternate means of attachment may be omitted from the holder; but since the clamping attachment involves two different tensioning steps to affix the holder to the rear of an automobile on the bumper thereof, it can be considered less preferred.

The trailer hitch attachment means comprises a flange 10 of essentially flat character affixed to the single metal bar 13 of the spare wheel holder in such a manner as to cause the single metal bar to be displaced to one side of the trailer hitch (and flange 10) and then project at an angle in a generally upwardly direction when the spare wheel is affixed to the automobile. The angle at which the single metal bar projects is between approximately 30 and 60° from the vertical. The metal bar remains with its essentially flat mounting plate and other parts in a general plane approximately parallel to a vertical plane along the rear of the automobile. To be noted is that fact that the flange 10 is affixed to the single metal bar in such a manner as to project at an angle of about 120° to 150° to the side thereof, thereby permitting one to use the ball of the trailer hitch for pulling a trailer even when the spare wheel holder is mounted also at the trailer hitch.

The single metal bar, in operable affixed position on the rear of an automobile, is characterized by having an essentially flat rim mounting plate section 23 oriented with its wider or flat face essentially parallel with a vertical plane along the rear of the automobile, regardless of whether the claw or the trailer hitch means of attachment for the spare wheel holder is employed. Connected to this rim mounting plate section 23 is a sloping shift section 24. The connection is through a bend 25 leaving the connected parts at an angle between about 95° and 160° (preferably between 125° and 145°). This bend 25 from the rim mounting plate section 23 is toward the automobile, thereby placing the rim mounting plate section as one of the rearmost or outermost portions of the spare wheel holder when it is affixed to an automobile.

A further bend 26 in the single metal bar connects a tire recess plate section 27 (or tire abutment plate section) to the sloping shift section 24; and this further bend 26 is essentially equal but of opposite angle to the bend 25 between the rim mounting plate section 23 and the sloping shift section 24. As a result, the tire recess plate section 27 extends towards a downwardly direction from the sloping shift section 24 and is essentially parallel with the rim mounting plate section 23 but oriented below the same and displaced toward the automobile with respect to the rim mounting plate 23.

The rim mounting plate section 23 is the uppermost section or end of the metal bar. It is the most remote section from the attachment means. It accounts for no more than about ⅓ of the length of the metal bar. Usually the length of the rim mounting plate section is no more than about 6 or possibly 7 inches; but it is of sufficient length to accommodate mounting means for holding the rim of a spare wheel. A signicant feature of the rim mounting plate section is that it has a fixed bolt position or a threaded stud 28 at one end of it (preferably nearest the sloping shift section for uniformity of tire position), and at least two and preferably at least three alternate bolt positions 29 (such as holes) spaced at predetermined increments from the other end of it. These bolt positions suitably may in all cases be simple holes through the rim mounting plate section, within which holes two bolts are positioned as the device is sold to the consumer. The fixed bolt position is in essence a threaded stud in that the bolt in the fixed bolt position may be welded or otherwise held in place, with its nut removable. The bolt or threaded rod and its nut in the alternate bolt position are capable of being moved to any one of the alternate bolt positions for use, in combination with the fixed bolt, to firmly bolt the rim of a spare wheel, through its stud-receiving holes, to the spare wheel holder.

The sloping shift section 24 is disposed from the rim mounting plate section toward the automobile when the holder is operably affixed; and this direction of the sloping shift section is such that the highest end of its is most rearwardly or outwardly when it is affixed to the automobile and the lowest end of it is nearest the automobile. The length of the sloping shift section suitably is between about 4 and 8 inches, preferably 5–7 inches.

The tire recess plate section 27, on the other hand, must be of sufficient length to accommodate the radial thickness of a tire 30 on a spare wheel rim 31 when the rim 31 is bolted to the rim mounting plate section 23. Generally, the tire plate section is at least 6 inches in length up to about 8 or 9 inches in length. In effect, the length of the sloping shift section 24 and the length of the tire recess plate section 27 are sufficient to form a tire-receiving recess with respect to the rim mounting plate section 23. This recess is occupied by the tire 30 on the wheel rim 31 when the latter is mounted on the rim mounting plate section 23. One radial side of the tire suitably abuts against the tire reccess plate section when the wheel is mounted.

A desirable structure forming part of the spare wheel holder, but one which may be omitted if desired, is the tire rest bar or plate 32. This plate is essentially perpendicular to the tire recess plate 27; and it extends rearwardly from the recess plate 27 toward, and even possibly somewhat beyond, the vertical plane in which the rim mounting plate 23 is located. Suitably, the tire rest plate 32 may be formed by a further bend 33 in the single metal bar 13 and therefore be part of the lower extremity of the single metal bar. The tire rest plate 32, fixed to the lowermost part of tire recess plate 27, is preferably so short (e.g., about 4 to 6 inches) that it terminates either short of or at approximately the vertical plane of the rim mounting plate 23. The tire 30 on a rim 31 to be mounted on rim plate 23 is allowed to rest upon tire rest plate 32 while one bolts the rim to plate 23. Thereafter, when driving, the spare tire is preferably in resting condition against rest plate 32. Suitably, only a portion of the tread width of the tire need rest on rest plate 32. In effect, there is no need to provide a rest plate of sufficient length to accommodate the entire width of the tread and edge planes of the tire, although such larger or longer rest plates (e.g., 8 to 10 inches horizontal direction) may optionally be used.

Figure 3:
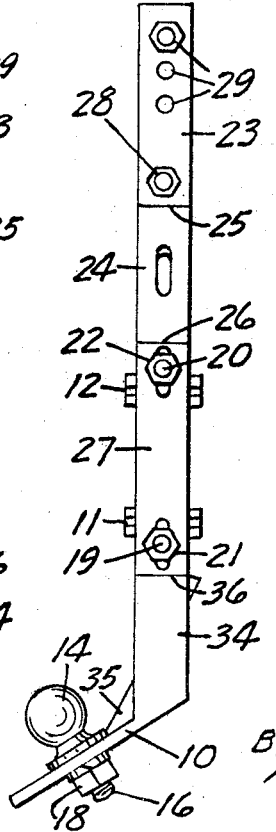
FIGURE 3 is a plan front view of the spare wheel holder (i.e., the rearmost side when the holder is attached to the rear of an automobile), with a trailer hitch ball added for illustration.
Figure 4:
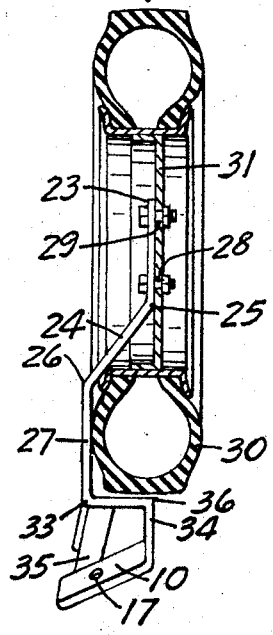
FIGURE 4 is a plan side view of the holder, with a spare wheel in cross-section mounted thereon.

Although each bend in metal bar 13 (which is preferably solid and suitably of essentially equal width and thickness throughout) may cause adjacent parts next to the bend, when the bar is viewed looking toward its flat surface (as in FIGURE 3), to be at an angle of 20° or so with respect to each other, the preferred practice is to avoid causing any great angularity (above 30°) between parts viewed looking toward the flat surface of the metal bar 13. However, when this angularity is only up to about 10° (or even slightly more), it is looked upon as being essentially non-existent; and the bent metal bar, viewed looking toward its flat surface, is considered to have its parts essentially "in line" (or straight).

An important function of the tire rest plate 32, in the embodiment of the holder having the flange 10 for fixing the holder to a trailer hitch tow bar, is that of bracing. It provides a depth to the holder (in the horizontal direction perpendicular to the rim mounting plate) which is lacking at the lowermost portion except when the tire rest plate 32 is present. This depth permits flange 10 to be firmly braced, e.g., through suitable connecting spans of metal such as brace bars 34 and 35, to the rest plate 32 and therefore to the single metal bar 13. Brace bar 34 suitably is an integral part of the metal bar 13; and in such cases, brace bar 34 is formed by a further bend 36 of metal bar 13 to a downwardly direction approximately perpendicular to the end of rest plate 32. As illustrated, brace bar 34 is attached to the most rearward end of flange 10 (i.e., the posterior end thereof) when the spare wheel holder is viewed as being affixed to the rear of an automobile.

Brace bar 35 is distinct from brace bar 34 in that brace bar 35 connects the metal bar 13, suitably from a location near the lower terminus of its tire recess section 27 or along the adjacent portion of tire rest plate 32, or from both said locations, to the flange 10 at the portion of flange 10 toward its outermost (and foremost or anterior) projecting extremity away from the metal bar 13. In the drawing, brace bar 35 is illustrated as extending from the lateral surface or edge of metal bar 13 most remote from laterally-displaced flange 10, and is illustrated as being attached to the portion of metal bar 13, identified as the tire rest plate 32, nearest the tire recess plate 27. Thus brace bar 35 forms its connection from a lateral portion of rest plate 32 near tire recess plate 27 to a lateral portion of flange 10 near its outermost extremity (or anterior terminus) where the mounting hole 17 is located. The connection to the lateral portion of flange 10 is on the side of that flange nearest single bar 13.

Flange mounting bar 10 is affixed to the holder at its lowermost extremity. This flange mounting bar 10 extends and is displaced laterally from the single metal bar 13, with the flange mounting bar being oriented in a lateral plane which approximately perpendicularly intersects a first plane parallel with the rim mounting plate section 23. It is also perpendicular to brace 34. Additionally, flange mounting bar 10 lies in a plane which intersects, at an angle between approximately 120° and 150°, a second plane which approximately bisects the single metal bar 13. It is emphasized that the flange mounting bar projects laterally away from the single metal bar 13 in a lateral plane; and preferably, the flange mounting bar extends laterally from the brace connection 34 between it and the rearwardmost or posterior portion of the tire rest plate (the portion of the tire rest plate most remote from the tire recess plate). From this brace connection, the flange mounting bar extends (in its lateral plane which is approximately 120 to 150° from the second plane approximately bisecting the single metal bar) in a lateral and angular direction which forms an angle of about 15 to 50° from a vertical plane (perpendicular to rim plate 23) through the approximate center of the connection between flange mounting bar 10 and brace member 34.

It will readily be appreciated that the simplified spare wheel holder of this invention is easily removed from a position on the exterior of an automobile for storage inside a trunk compartment whenever sufficient space after storing other items therein is available. The device of this invention may be removed and re-affixed to the exterior of an automobile at will and with great simplicity. Such features have not to our knowledge been characteristic of any spare wheel holders.

That which is claimed is:

1. An automobile spare wheel holder adapted to be removably affixed to the exterior of an automibile or stored in the trunk of the automobile when available space in said trunk is such that the spare wheel may also be stored therein, consisting essentially of attachment means to removably and operably affix said holder to a rear part of an automobile, and a single metal bar permanently and immovably united to said attachment means and held by said attachment means in an upwardly projecting direction from said attachment means when said holder is operably affixed, said single metal bar, as said holder is in said operably affixed condition at the rear of an automobile, being characterized by having an essentially flat rim mounting plate section which is oriented essentially parallel with a vertical plane along the rear of the automobile, a sloping shift section connected to said rim mounting plate section at an angle between 95° and 160° through a bend in said metal bar toward said automobile, and a tire recess plate section connected to said sloping shift section through an additional bend of essentially equal but opposite angle in said metal bar toward a downwardly direction such that said tire recess plate section is essentially parallel with said rim mounting plate section and oriented below the same, said rim mounting plate section being at the end of said metal bar most remote from said attachment means and accounting for no more than about ⅓ of the length of said metal bar, said sloping shift section being such that the highest end thereof is most rearwardly and the lowest end thereof is nearest the automobile, the length of said sloping shift section and the length of said tire recess plate section being sufficient to form a tire receiving recess with respect to said rim mounting plate section, which said recess is occupied by the tire on a wheel rim when the latter is mounted on said rim mounting plate section, and said rim mounting plate section being characterized by having adjustable means for mounting the rim of a spare wheel rigidly thereto.

2. The spare wheel holder of claim 1 characterized by additionally having a tire rest bar extending approximately perpendicularly and rearwardly from the lower extremity of the tire recess plate section and off the same side of said tire recess plate section as the sloping shift section.

3. The spare wheel holder of claim 1 wherein the attachment means consists essentially of two cooperating claw-like clamps removably mounted in longitudinally spaced holes in said single metal bar at locations other than in said rim mounting plate section and other than in the upper third of said sloping shift section, said clamps being adapted to clamp the upper and lower edge of the rear bumper of the automobile in such a manner as to orient the single metal bar to project approximately perpendicularly and upwardly from the rear bumper of the automobile.

4. The spare wheel holder of claim 1 wherein the attachment means consists essentially of a flat flange mounting bar of metal fixed at the lowermost extremity of said holder, and laterally displaced from said single metal bar, said flange mounting bar being oriented in a lateral plane,
 (i) said lateral plane being such that it approximately perpendicularly intersects a first plane which is parallel with said rim mounting plate section, and
 (ii) said lateral plane also being such that it intersects, at an angle between approximately 120° and 150°, a second plane which approximately bisects said single metal bar along the length thereof, said second plane being perpendicular to said first plane,
said flange mounting bar being characterized by projecting laterally away from said single metal bar in said lateral plane and by having a mounting hole near its outermost extremity away from said single metal bar, whereby said single metal bar is laterally displaced a sufficient distance from the location of the hole in said flange mounting bar to permit a trailer to be drawn from the ball of a ball-type trailer-hitch tow bar to which said flange mounting bar is affixed at its mounting hole portion.

5. The spare wheel holder of claim 4 characterized further in that a tire rest plate extends approximately perpendicularly and rearwardly from the lower extremity of the tire recess plate section and off the same side of said tire recess plate section as the sloping shift section, said tire rest plate being at a level higher than said flat flange mounting bar, and in that said flange mounting bar is bracedly fixed to said tire rest plate by brace bars, one of which extends from the end of said tire rest plate most remote from said tire recess plate to the end of said flange mounting bar most remote from the end thereof having said mounting hole, and another of which extends from a lateral portion of said tire rest plate adjacent said tire recess plate and on the side of said tire rest plate most remote from said flange mounting bar to a lateral portion of said flange mounting bar near the mounting hole therein and on the side thereof nearest said tire rest plate.

6. An automobile spare wheel holder adapted to be removably affixed to the exterior of an automobile or stored in the trunk of the automobile when available space in said trunk is such that the spare wheel may also be stored therein, consisting essentially of attachment means to removably and operably affix said holder to a rear part of an automobile, and a single metal bar permanently and immovably united to said attachment means and held by said attachment means in an upwardly projecting direction from said attachment means when said holder is operably affixed, said attachment means being characterized by having a flange bar of metal laterally displaced from and immovably united to said single metal bar, said single metal bar, as said holder is in said operably affixed condition at the rear of an automobile, being characterized by having an essentially flat rim mounting plate section which is oriented essentially parallel with a vertical plane along the rear of the automobile, a sloping shift section connected to said rim mounting plate section at an angle between 95° and 160° through a bend in said metal bar toward said automobile, and a tire recess plate section connected to said sloping shift section through an additional bend of essentially equal but opposite angle in said metal bar toward a downwardly direction such that said tire recess plate section is essentially parallel with said rim mounting plate section and oriented below the same, said rim mounting plate section being at the end of said metal bar most remote from said attachment means and accounting for no more than about ⅓ of the length of said metal bar, said sloping shift section being such that the highest end thereof is most rearwardly and the lowest end thereof is nearest the automobile, the length of said sloping shift section and the length of said tire recess plate section being sufficient to form a tire receiving recess with respect to said rim mounting plate section, which said recess is occupied by the tire on a wheel rim wheel when the latter is mounted on said rim mounting plate section, and said rim mounting plate section being characterized by having adjustable means for mounting the rim of a spare wheel rigidly thereto.

7. The spare wheel holder of claim 6 characterized by additionally having a tire rest bar extending rearwardly from the lower extremity of the tire recess plate section and off the same side of said tire recess plate section as the sloping shift section, said tire rest bar being immovably united to said tire recess plate sction and to said flange bar of metal of said attachment means.

8. The spare wheel holder of claim 6 wherein the flange bar of metal of the attachment means is oriented in a lateral plane,
 (i) said lateral plane being such that it approximately perpendicularly intersects a first plane which is parallel with said rim mounting plate section and
 (ii) said lateral plane also being such that it intersects, at an angle between approximately 120° and 150°, a second plane which approximately bisects said single metal bar along the length thereof, said second plane being perpendicular to said first plane,
said flange bar being characterized by projecting laterally away from said single metal bar in said lateral plane and by having a mounting hole near its outermost extremity away from said single metal bar, said flange bar being adapted to be fastened at said mounting hole to a trailer-hitch tow bar on an automobile.

9. An automobile spare wheel holder adapted to be removably affixed to the exterior of an automobile or stored in the trunk of the automobile when available space in said trunk is such that the spare wheel may also be stored therein, consisting essentially of attachment means to removably and operably affix said holder to a rear part of an automobile, and a single metal bar permanently and immovably united to said attachment means and held by said attachment means in an upwardly projecting direction from said attachment means when said holder is operably affixed, said single metal bar, as said holder is in said operably affixed condition at the rear of an automobile, being characterized by having an essentially flat rim mounting plate section which is oriented essentially parallel with a vertical plane along the rear of the automobile, a sloping shift section connected to said rim mounting plate section at an angle between 95° and 160° through a bend in said metal bar toward said automobile, and a tire recess plate section connected to said sloping shaft section through an additional bend of essentially equal but opposite angle in said metal bar toward a downwardly direction such that said tire recess plate section is essentially parallel with said rim mounting plate section and oriented below the same, said rim mounting plate section being at the end of said metal bar most remote from said attachment means and accounting for no more than about ⅓ of the length of said metal bar, said sloping shift section being such that the highest end thereof is most rearwardly and the lowest end thereof is nearest the automobile, the length of said sloping shift section and the length of said tire recess plate section being sufficient to form a tire receiving recess with respect to said rim mounting plate section, which said recess is occupied by the tire on a wheel rim when the latter is mounted on said rim mounting plate section, and said rim mounting plate section being characterized by having a fixed bolt position at one end thereof and by having alternative bolt positions at the other end thereof; said spare wheel holder being further characterized by having a tire rest bar extending approximately perpendicularly and rearwardly from the lower extremity of the tire recess plate section and off the same side of said tire recess plate section as the sloping shift section.

References Cited
UNITED STATES PATENTS

| | | | |
|---|---|---|---|
| 2,733,847 | 2/1956 | Pyes | 224—42.21 |
| 2,801,780 | 8/1957 | Dall | 224—42.21 |

HUGO O. SCHULZ, *Primary Examiner.*